(12) United States Patent  
Koelker

(10) Patent No.: US 7,048,017 B2  
(45) Date of Patent: May 23, 2006

(54) SILAGE BAG FILLING MACHINE

(76) Inventor: Michael J. Koelker, 11272 Wuchter Rd., Dyersville, IA (US) 52040

( * ) Notice: Subject to any disclaimer, the term of this patent is extended or adjusted under 35 U.S.C. 154(b) by 0 days.

(21) Appl. No.: 10/430,862

(22) Filed: May 6, 2003

(65) Prior Publication Data

US 2006/0065323 A1    Mar. 30, 2006

(51) Int. Cl.  
*A01F 25/00* (2006.01)

(52) U.S. Cl. ............... 141/73; 141/114; 141/231; 100/100; 53/255; 53/459; 53/570

(58) Field of Classification Search ............... 141/71, 141/73, 114, 231; 100/65, 100; 53/255, 53/459, 473, 475, 570  
See application file for complete search history.

(56) References Cited

U.S. PATENT DOCUMENTS 4,327,543 A  *  5/1982  Currie et al. ............... 56/344

5,140,802 A  *  8/1992  Inman et al. ............... 53/459

FOREIGN PATENT DOCUMENTS

GB        2303818 A  *  3/1997  
JP    406153683 A  *  6/1994

* cited by examiner

*Primary Examiner*—J. Casimer Jacyna  
(74) *Attorney, Agent, or Firm*—Allan L. Harms

(57) ABSTRACT

A silage bag filling machine for compactly loading an elongate polymer silage storage bag includes a generally horizontal chamber through which a ram reciprocates in a generally horizontal direction, forcing silage from the chamber into a frame which carries the gathered sidewall of the silage storage bag. The frame has a curved upper surface and an open bottom. The bag filling machine is supported on wheels and is forced gradually forward as the bag fills, against the restraint of an adjustable brake. An loading elevator mounted to the side of the bag filling machine feeds silage into the horizontal chamber.

19 Claims, 7 Drawing Sheets

US 7,048,017 B2

SILAGE BAG FILLING MACHINE

STATEMENT REGARDING FEDERALLY SPONSORED RESEARCH OR DEVELOPMENT

Not Applicable.

BACKGROUND OF THE INVENTION

The present invention pertains to the filling of elongate storage bags for silage feed for farm livestock. In the raising of livestock and particularly the raising of dairy cattle, hay and green corn are cut to a specified fiber length and are stored on the farm in silage bunkers or in lengthy large-diameter plastic silage bags which may extend for considerable length. The plastic bags are relatively thick-walled flexible bags which are available in various cross sectional areas, but generally four-foot to nine-foot diameter bags are used for silage storage. These bags are ideally filled compactly with silage allowing few air pockets so that the silage feed remains in good condition for months at a time.

Filling of the lengthy silage bags is currently accomplished by use of one of two types of machines which force silage into the bags. In one type of machine, silage is forced into the elongate storage bag by use of a transverse rotating roller which is fitted with radial arms which sweep the silage into the bag. A backstop is retained to the machine by cables attached to winches mounted on either side of the machine. The backstop is used to prevent the bag from being forced away from the machine before it is filled to proper compaction. In another type of machine, a screw auger oriented to the axis of the bag forces silage therealong into the interior of the bag. Both types of machines are typically powered from the power take off shaft of a farm tractor and require substantial power to operate.

The conventional machines require substantial power to operate them, namely at least ninety hp, and in addition, the cables which extend along the sides of the bag tend to abrade the bag, leading to breaks in the sidewall of the bag along its length, which leads to loss of the desired airtight packaging.

BRIEF SUMMARY OF THE INVENTION

The invention of this disclosure provides a silage bag filling machine which uses substantially less power from the power unit or farm tractor operating the machine. The improved machine fills silage bags properly without the need for a backstop and cables to hold the backstop. An elongate housing is oriented generally horizontally and has a hut-like frame extending from it. The frame has a curved top, sides, and an open bottom and is used to store the unused silage bag around it and to hold the bag open so that it can be filled. The frame has an open bottom for ease of removal of the machine from the open end of a filled bag. The elongate housing contains a reciprocating ram sliding back and forth within it such that silage entering the housing is forced by the ram into the frame and then into the bag from the force of silage being continually forced out of the housing. The housing has an opening at its top such that silage can drop into the housing to be acted on by the ram. An elevator is mounted to the top of the housing and allows silage exiting a chopper wagon to be lifted up and dumped into the opening in the housing. The elevator may be wider than the opening in the top of the housing and a secondary collector conveyor is used to consolidate the silage into the opening of the housing. The elevator is equipped with hydraulic cylinder powered arms which allow easy adjustment of the elevator and its storage alongside the housing when ready for movement. This machine provides an improved loading of the storage bag with less power needed from the power unit, namely the farm tractor.

It is a primary object of the invention to provide a silage bag filling machine which operates on substantially less power than conventional machines while properly compacting silage.

It is another object of the invention to provide a silage bag filling machine which does not require a backstop.

It is also an object of the invention to provide a versatile silage bag filling machine which is compact and may be transported efficiently and safely.

These and other objects of the invention will become apparent from examination of the description and claims which follow.

BRIEF DESCRIPTION OF THE SEVERAL VIEWS OF THE DRAWING(S)

DETAILED DESCRIPTION OF THE INVENTION

Figure 1:
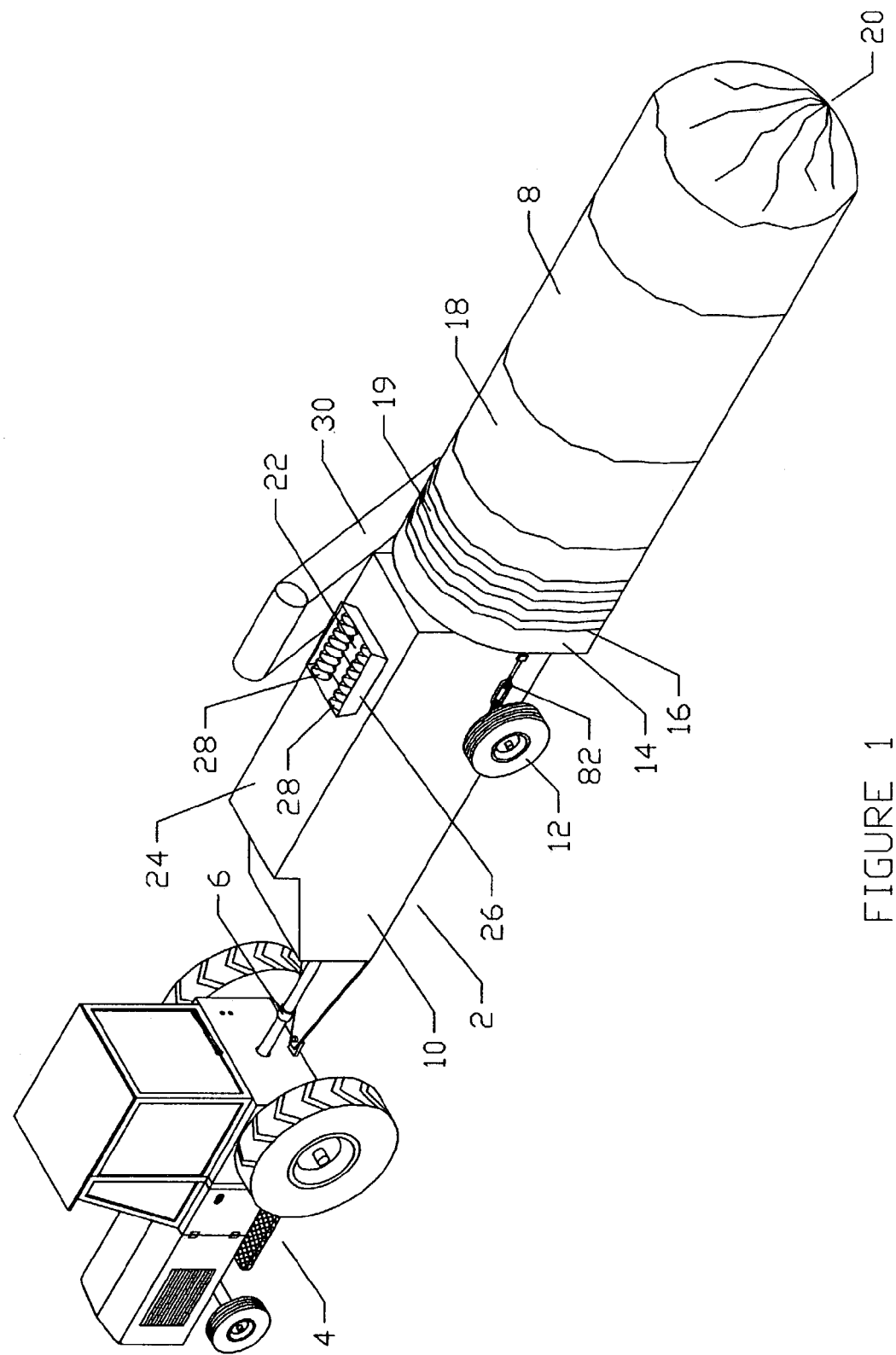
FIG. 1 is a perspective view of the silage bag filling machine of the present invention being powered by the power take off of a tractor and with a silage bag mounted at the output end of the machine.

FIG. 1 discloses the preferred embodiment of silage bag filling invention 2 being powered by tractor 4 or a like power unit having a power take off shaft 6. An elongate silage bag 8 is mounted to invention 2 and is shown in FIG. 1 in a partially filled condition. In operation, the wheel drive transmission of tractor 4 is left in neutral so that the tractor 4 and invention 2 may creep ahead in response to silage being forced into silage bag 8. Invention 2 comprises a housing 10 supported on wheels 12 and includes a frame 14 about which the open end 16 of bag 8 may be placed and the sidewall 18 of bag 8 may be gathered. Bag 8 is a conventional continuous open tube of flexible plastic material which has been tied closed at its distal end 20.

Housing 10 is provided with a port 22 in its roof 24. Port 22 provides an entryway for silage into the interior of housing 10. Overlying port 22 is collection box 26 which is equipped with screw conveyers 28 which move silage within collection box 26 toward port 22. An elevator 30 is mounted movably to housing 10 to provide means to feed silage into collection box 26 for collection and transfer into port 22.

After silage is dropped into port 22, it is forced into open end 16 of bag 8. Gathers 19 of sidewall 18 of bag 8 are pulled from frame 14 as the effective length of silage bag 8 increases as bag 8 fills with silage. Customarily bag 8 will be supported on the ground surface and left outdoors as a long term storage of silage intended as livestock fodder.

Figure 2:
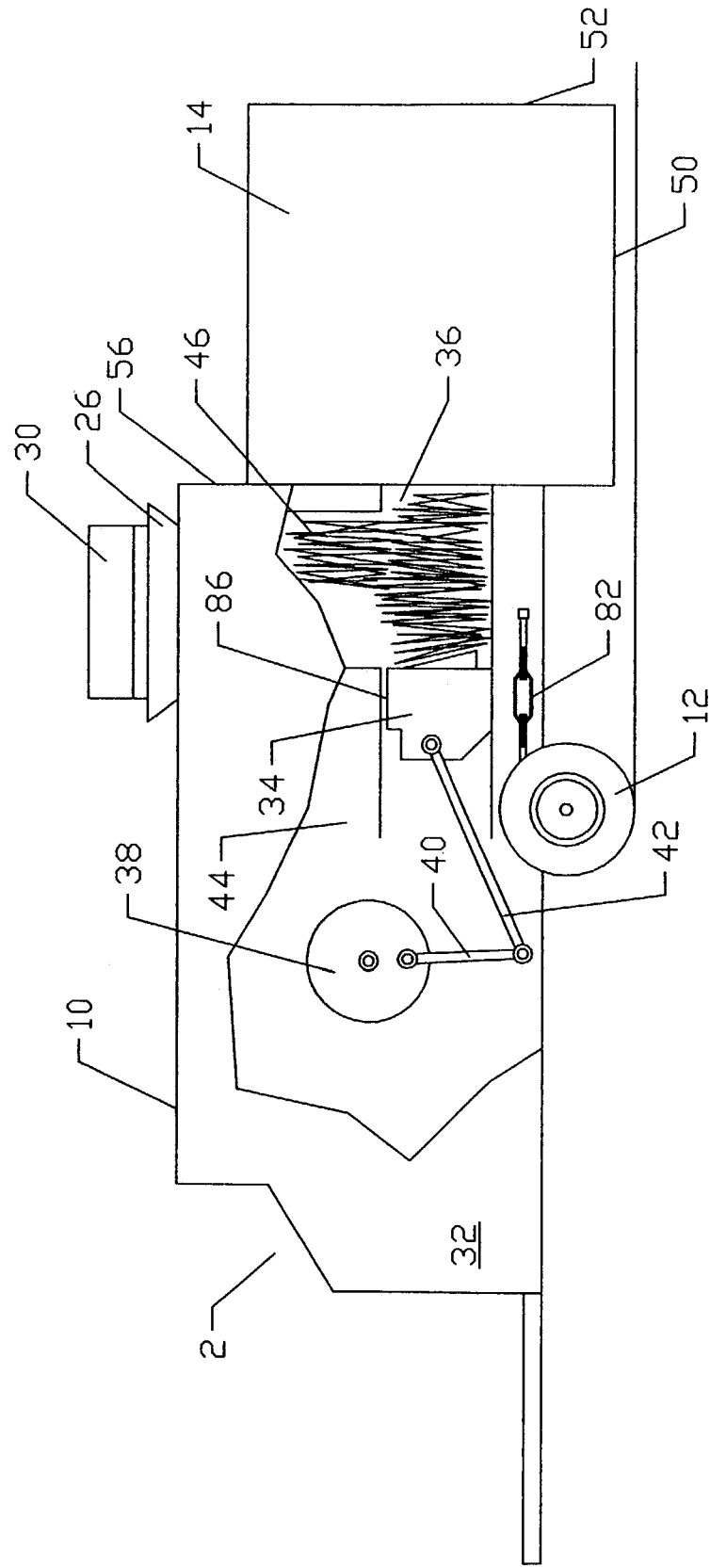
FIG. 2 is a front elevation of the preferred embodiment of the silage bag filling machine of the present invention with part of its front sidewall cut away.
Figure 3:
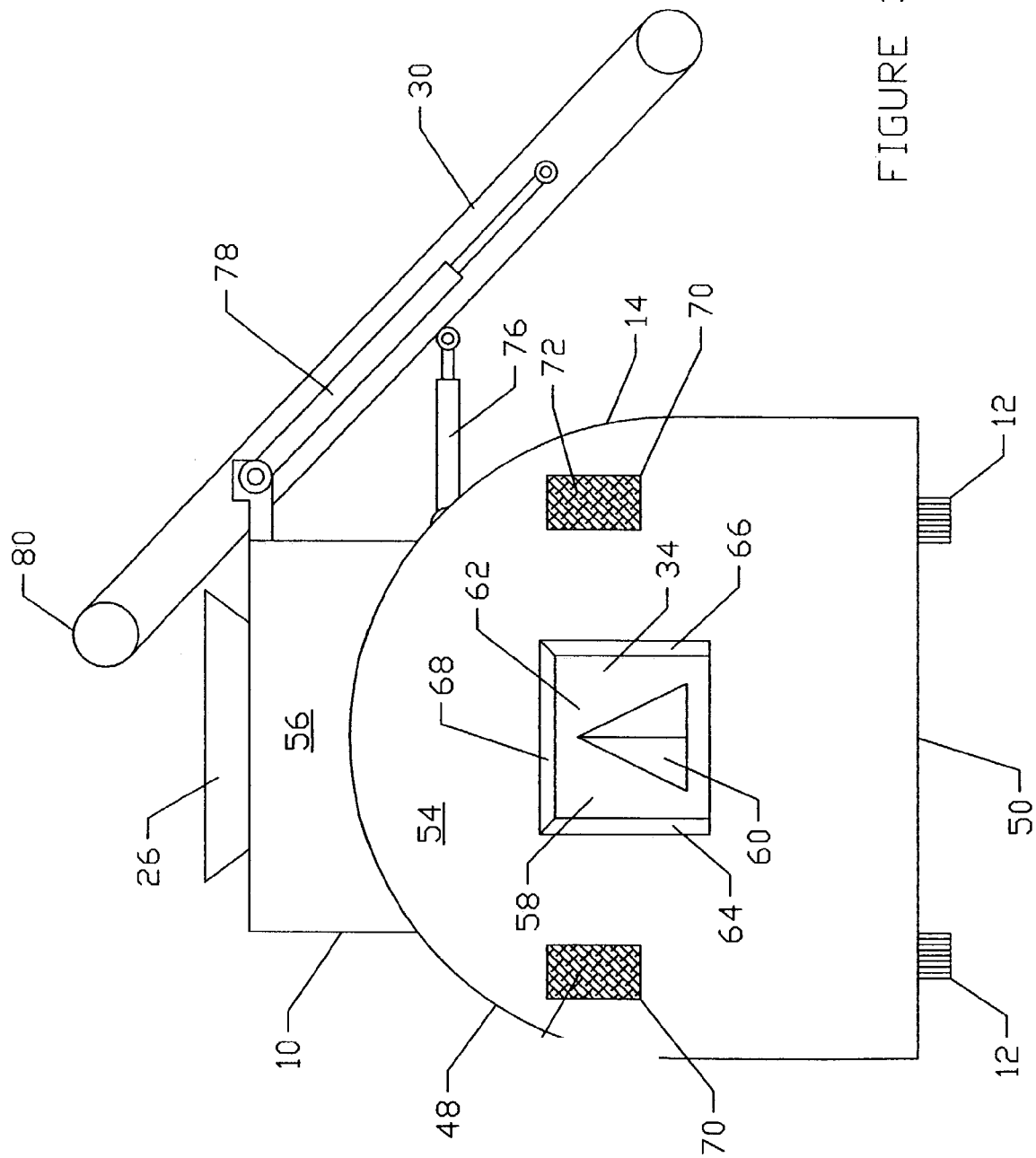
FIG. 3 is a side plan view of the silage bag filling machine of FIG. 2.

Referring now in addition to FIG. 2, the invention 2 is shown with part of its front sidewall 32 cut away to reveal schematically the operative components therein. A reciprocating ram 34 is operable in a generally horizontal path within compaction chamber 36. Ram 34 is driven by a drive wheel 38 coupled to ram 34 by linkage arms 40, 42. Rotation of drive wheel 38 causes ram 34 to move rearward in housing 10 across compaction chamber 36 and then to retract below wiper 44. Silage 46 drops from collection box 26 into compaction chamber 36 and is forced by ram 34 into frame 14 about which a silage storage bag may be mounted. Because silage 46 will be continuously fed to invention 2, silage 46 will necessarily drop onto ram 34 when it is thrust toward the frame 14, and wiper 44 will strip silage from top 86 of ram 34 as it retracts. Referring now in addition to FIG. 3, it can be seen that frame 14 is preferably provided with a sidewall 48 of generally inverted u-shape and an open bottom 50. Frame 14 is open at its rear end 52 and has a front wall 54 which abuts the rear endwall 56 of housing 10. The working face 58 of ram 34 is provided with spear element 60 extending therefrom, though a planar working face 58 is also functional. Discharge opening 62 of compaction chamber 36 opens into frame 14 and is provided with flanges 64, 66, 68 which flare outwardly from discharge opening 62 at the sides and top thereof respectively. Windows 70 covered with screen or mesh 72 may be provided in front wall 54 for observation of silage located within frame 14.

Elevator 30 is supported by hinge bracket 74 and by first hydraulic cylinder 76 so that elevator 30 may swing away from housing 10 by extension of first hydraulic cylinder 76 and be raised or lowered longitudinally by second hydraulic cylinder 78 to position upper end 80 of elevator 30 generally over collection box 26 so that silage conveyed upwardly along elevator 30 will drop into collection box 26. At least one of wheels 12 of housing 10 is equipped with a manually adjustable brake control 82 which permits tension on the brake of the wheel 12 to be set such that the invention 2 and tractor 4 may be forced ahead gradually as the bag 8 is filled. Manual adjustment of the wheel brake by brake control 82 allows the user to selectively restrict longitudinal movement of the invention 2 where invention 2 is stationed on a slight slope or in response to the softness of the surface on which wheels 12 rest. In the preferred embodiment, turnbuckle 84 is mounted to housing 10 at one end thereof and to a brake shoe on the other end thereof and may be lengthened or shortened manually to increase or decrease tension on the brake shoe.

Figure 4:
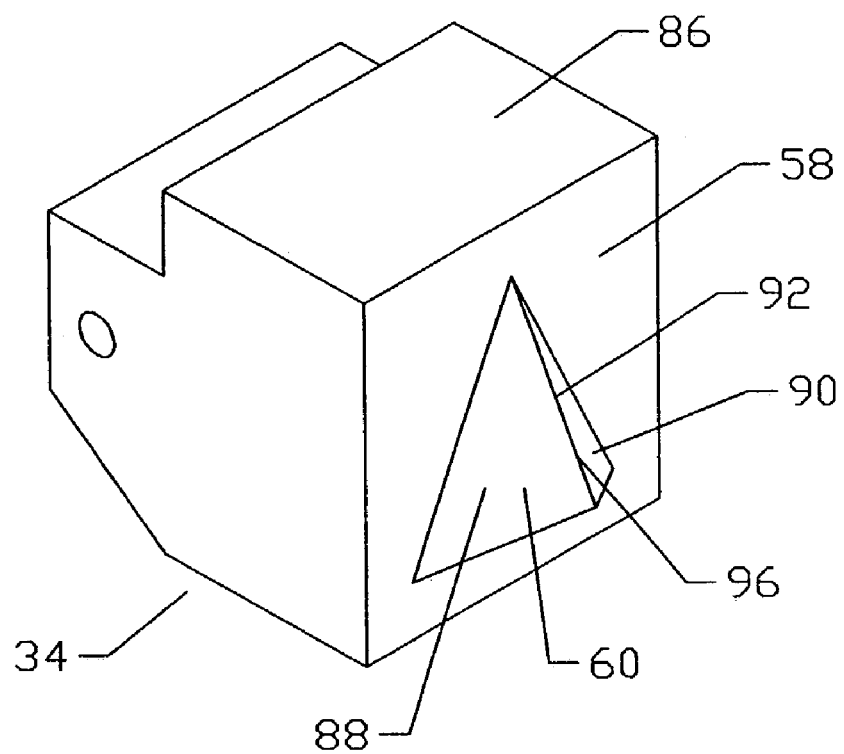
FIG. 4 is a front left perspective of the ram of the preferred embodiment silage bag filling machine of FIG. 2.
Figure 4A:
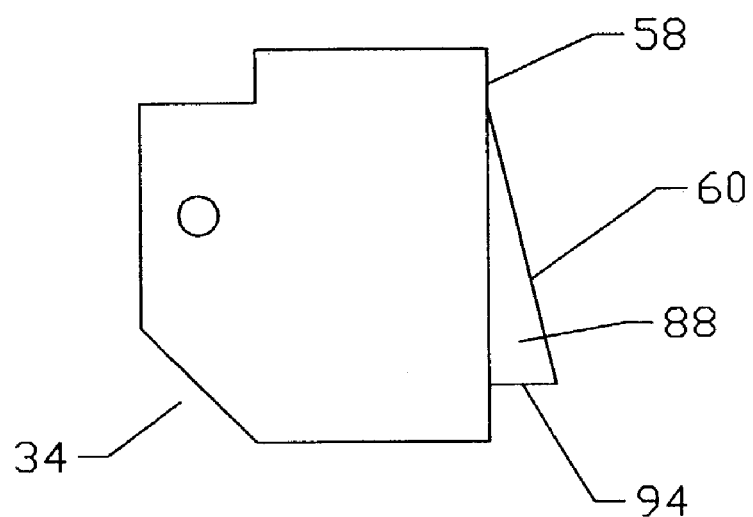
FIG. 4a is a front elevation of the ram of FIG. 4.

An enlargement of the ram body 86 is shown in FIGS. 4 and 4a which show that ram body 86 has disposed on working face 58 thereof a spear element 60 which comprises a pyramidal section including a first facet 88 joined to a second facet 90 at leading corner 92. Spear element 60 includes lower face 94 which with facets 88, 90 defines edge 96. Spear element 60 is fixed generally centrally upon working face 58. First and second facets 88, 90 of spear element 60 extend further from working face 58 as they approach edge 96 of spear element 60 and facets 88, 90 serve to urge silage driven by ram body 86 in an upward vector.

Figure 5:
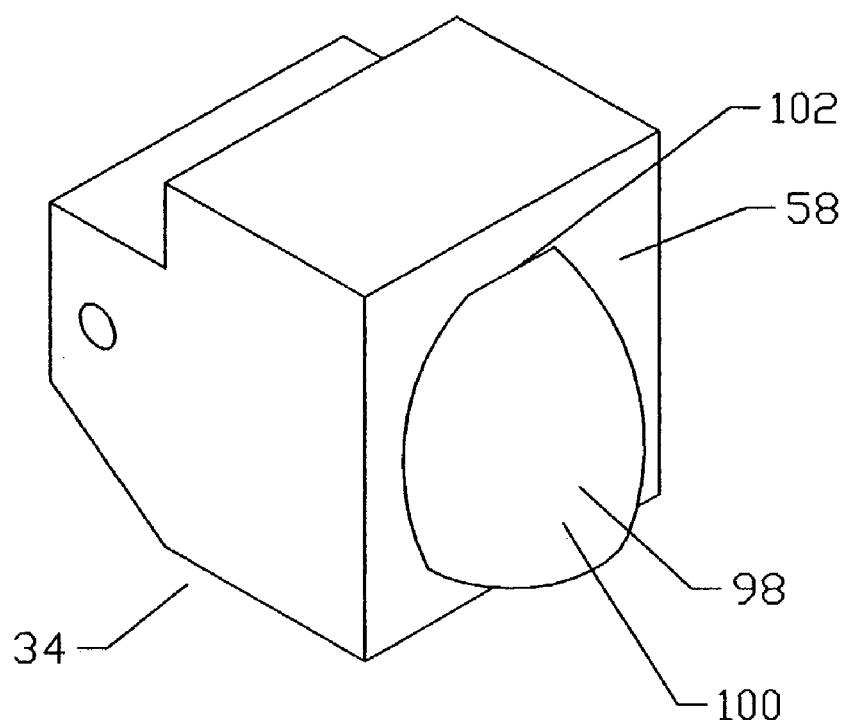
FIG. 5 is a front left perspective of an alternate embodiment ram.
Figure 5A:
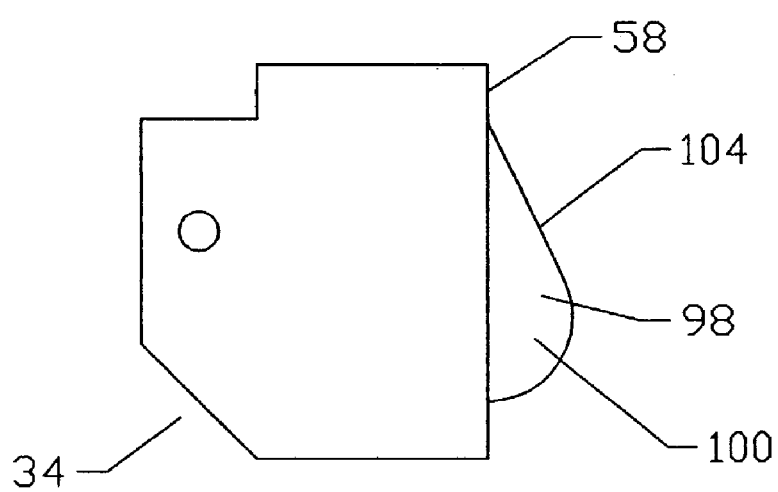
FIG. 5a is a front elevation of the ram of FIG. 5.

FIGS. 5 and 5a illustrate an alternative embodiment of ram 34 wherein a curved protrusion 98 is fixed to working face 58 of ram 34. Protrusion 98 comprises a bulbous lower bulge 100 and a linear upper edge 102 such that the protruding surface 104 of protrusion 98 exerts an upwards and sideways diverging thrust on silage which comes into touching engagement with working face 58. Protrusion 98 may be a segment of an ellipsoid body.

Figure 6:
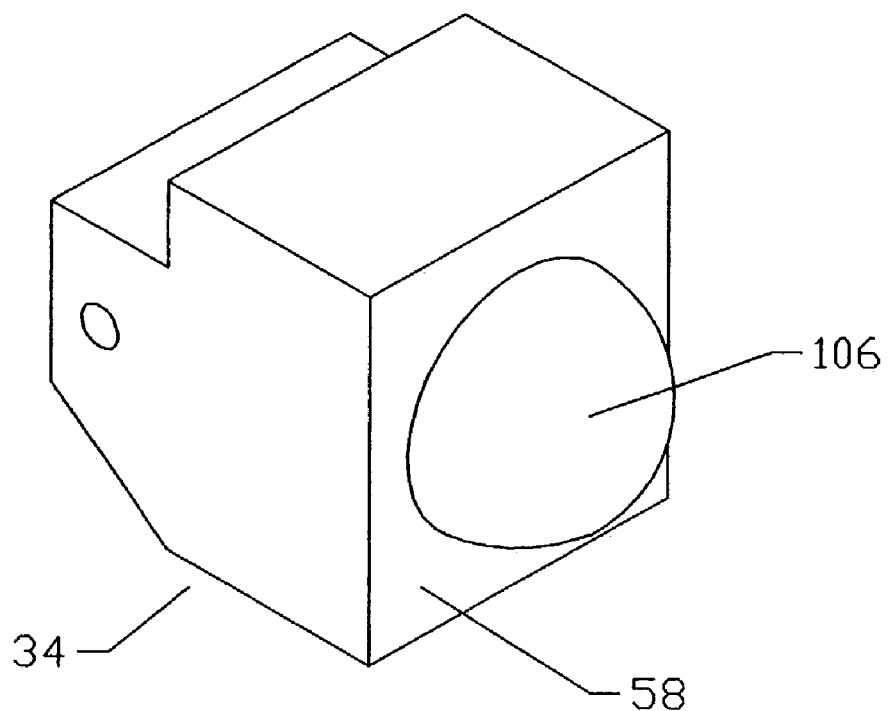
FIG. 6 is a front left perspective of another alternate embodiment ram.
Figure 6A:
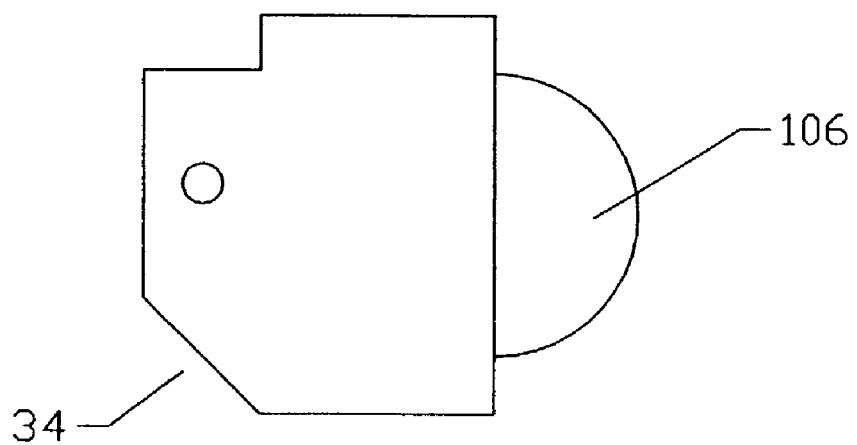
FIG. 6a is a front elevation of the ram of FIG. 6.

Another alternate embodiment of ram 34 is illustrated in FIGS. 6 and 6a wherein a hemispherical protrusion 106 is fixed to working face 58 of ram 34.

Figure 7:
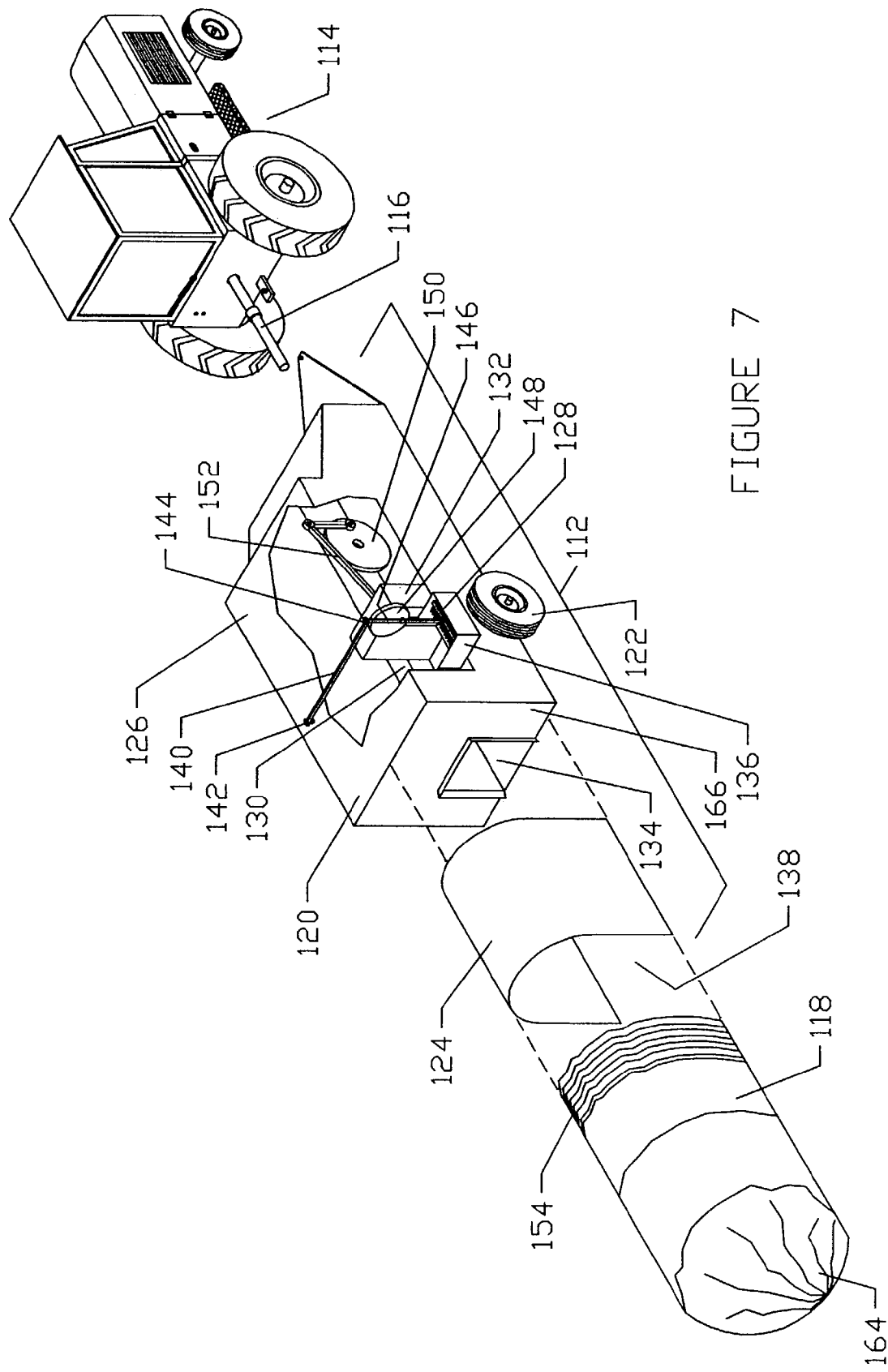
FIG. 7 is a exploded view in perspective of an alternative embodiment silage bag filling machine, a silage storage bag partly filled by the machine and a tractor for driving the silage bag filling machine, with parts of the machine cut away.

An alternate embodiment of the silage bag filling machine invention is illustrated in exploded perspective in FIG. 7 wherein alternate embodiment invention 112 is shown being powered by the power takeoff shaft 116 of tractor 114. In this alternate embodiment, silage bag 118 may be of smaller cross section but it may be slid over duct 124 such that its sidewall 154 is gathered or folded telescopingly on itself about the exterior of duct 124. Alternate embodiment invention 112 comprises housing 120 supported on wheels 122 with duct 124 mounted at the rear end 166 of housing 120. A receiving trough 136 into which silage may be poured is disposed laterally on housing 120 such that rake 128 may drag silage from trough 136 into the compaction chamber 130 such that silage will enter the path of compacting ram 132. Compacting ram 132 reciprocates across compaction chamber 130 such that silage is propelled from outlet 134 into bag 128 which surrounds duct 124. It can be seen that duct 124 has an open bottom 138 which is suspended a small distance above the ground to facilitate placement of bag 118 about duct 124 but to also allow silage in bag 118 to load the lower side of the bag 118 such that it will rest on the ground.

The movement of rake 128 is controlled by first link arm 140 which is pivotally anchored to roof 126 of housing 120 such that first link arm may only move vertically about anchor 142. At its free end 144, first link arm 140 is hinged to second link arm 146 which is eccentrically mounted to rake drive wheel 148 along its length such that rake 128 will reciprocatingly move to reach back and over trough 136 and then forward and down into trough 136 to drag any silage in trough 136 into compaction region 130 so that it may be forced through outlet 134 by ram 132. Ram 132 is driven by ram drive wheel 150 and linked thereto by linkage 152 which converts the rotation of ram drive wheel 150 into linear reciprocating motion of ram 132. The observer may identify the ram 132 and rake 128 to be similar to the structures of a 1950's era hay baler which dispenses rectangular bales. In this embodiment, ram 132 reciprocates at approximately thirty-one times per minute. As the ram 132 forces silage into bag 118, invention 112 and tractor 114 are urged to creep ahead as bag 118 is pulled off duct 124 by silage urged against its closed end 164.

Use of the preferred embodiment and the alternate embodiment of the invention has demonstrated that the invention fills a silage bag with evenly packed silage with few air pockets. In addition, either embodiment of the invention operates on far less power than conventional silage bagging machines.

Having described the invention, I claim:

1. Apparatus to force silage into an elongate silage storage bag, the silage storage bag having an elongate continuous sidewall, comprising an elongate housing supported on wheels, the housing having a compaction chamber therein, the compaction chamber disposed substantially horizontally, the compaction chamber having a reciprocating ram moveable linearly therein, the compaction chamber having a discharge end with an outlet opening therein, the housing having an opening therein to permit silage to be received in the compaction chamber, a duct supported on the discharge end of the compaction chamber and extending therefrom, the duct having a substantially horizontal sidewall and an open bottom, the duct having an interior in communication with the outlet opening of the compaction chamber, the duct receiving an open end of the silage storage bag thereabout, the sidewall of the duct supporting gathered portions of the continuous sidewall of the silage storage bag, the ram urging silage through the outlet opening into the storage bag surrounding the duct.

2. The apparatus of claim 1 wherein
the ram having an engagement face which touchingly engages silage to be urged through the outlet opening, the engagement face having a protruding body fixed thereto.

3. The apparatus of claim 2 wherein
the protruding body comprises a pyramidal segment having a substantially horizontal lower wall.

4. The apparatus of claim 3 wherein
the outlet has flanges thereon extending into the interior of the duct,
the flanges diverging from the outlet opening.

5. The apparatus of claim 4 wherein
an elevator conveyor is adjustably mounted to a side of the housing,
the elevator selectively moveable longitudinally and horizontally,
the elevator having an upper discharge end and an opposing lower end.

6. The apparatus of claim 5 wherein
the elevator mounted to the housing by at least a first hydraulic cylinder having an extendible rod,
extension of the extendible rod of the at least a first hydraulic cylinder causes the lower end of the elevator to move away from the housing.

7. The apparatus of claim 6 wherein
the elevator is connected to the housing along the length thereof by at least a second hydraulic cylinder,
the at least a second hydraulic cylinder causing the elevator to move longitudinally when a rod of the at least a second hydraulic cylinder is extended.

8. The apparatus of claim 7 wherein
the opening in the housing is in a top thereof,
the upper discharge end of the elevator overlies the opening in the housing,
whereby silage may be continuously fed into the compaction chamber.

9. The apparatus of claim 1 wherein
a selectively controlled brake restrains rotation of the wheels.

10. The apparatus of claim 1 wherein
the opening in the housing is in a sidewall of the housing,
a trough is disposed adjacent the opening in the housing for receiving silage therein,
a rake forces silage into the compaction chamber through the opening in the sidewall of the housing.

11. A silage bag filling apparatus comprising
an elongate hollow housing supported on wheels,
the housing disposed generally horizontally and having an opening at an outlet end thereof,
a driven ram reciprocatingly moveable within the housing between a retracted position and an extended position,
the ram having an engagement face oriented toward the outlet end of the housing,
the engagement face urging silage toward the outlet end of the housing during movement of the ram toward its extended position,
a hollow elongate frame mounted to the housing at its outlet end,
the frame having a generally horizontally disposed outer surface,
the frame receiving an open end of an elongate silage bag thereabout and storing unused portions of the bag on the outer surface thereof,
the engagement face of the ram has a protrusion extending therefrom.

12. The silage bag filling apparatus of claim 11 wherein
the protrusion of the engagement face comprises a multifaceted polygon.

13. The silage bag filling apparatus of claim 11 wherein
the protrusion of the engagement face comprises a hemispherical body.

14. The silage bag filling apparatus of claim 11 wherein
the protrusion of the engagement face comprises a curved body having a lower portion and an upper portion thereof,
the lower portion of the curved body extending further away from the engagement face than the upper portion of the curved body.

15. A silage bag filling apparatus comprising
an elongate hollow housing supported on wheels,
the housing disposed generally horizontally and having an opening at an outlet end thereof,
a driven ram reciprocatingly moveable within the housing between a retracted position and an extended position,
the ram having an engagement face oriented toward the outlet end of the housing,
the engagement face urging silage toward the outlet end of the housing during movement of the ram toward its extended position,
a hollow elongate frame mounted to the housing at its outlet end,
the frame having a generally horizontally disposed outer surface,
the frame receiving an open end of an elongate silage bag thereabout and storing unused portions of the bag on the outer surface thereof,
the housing has a top wall,
an opening in the top wall overlies a region in the housing over which the ram moves,
an elevator is mounted to the housing and is adjustable thereon,
the elevator having an upper discharge end overlying the opening in the housing.

16. A silage bag filling apparatus comprising
an elongate hollow housing supported on wheels,
the housing disposed generally horizontally and having an opening at an outlet end thereof,
a driven ram reciprocatingly moveable within the housing between a retracted position and an extended position,
the ram having an engagement face oriented toward the outlet end of the housing,
the engagement face urging silage toward the outlet end of the housing during movement of the ram toward its extended position,
a hollow elongate frame mounted to the housing at its outlet end,
the frame having a generally horizontally disposed outer surface, the frame receiving an open end of an elongate silage bag thereabout and storing unused portions of the bag on the outer surface thereof,
the frame has a sidewall having a curved top,
the frame having an open bottom and open rear end,
the frame having an interior in communication with the opening in the outlet end of the housing,
the frame suspended above the ground surface to facilitate placement of a silage bag thereon.

17. A silage bag filling apparatus comprising
an elongate hollow housing supported on wheels,
the housing disposed generally horizontally and having an opening at an outlet end thereof,
a driven ram reciprocatingly moveable within the housing between a retracted position and an extended position,
the ram having an engagement face oriented toward the outlet end of the housing,
the engagement face urging silage toward the outlet end of the housing during movement of the ram toward its extended position,
a hollow elongate frame supported on the housing at its outlet end,
the frame having a generally horizontally disposed outer surface,
the frame receiving an open end of an elongate silage bag thereabout and storing unused portions of the bag on the outer surface thereof.

18. The silage bag filling apparatus of claim 17 wherein
a means for feeding silage into the housing is mounted to the housing,
means for driving the ram is provided in the housing.

19. A silage bag filling apparatus comprising
an elongate hollow housing supported on wheels,
the housing disposed generally horizontally and having an opening at an outlet end thereof,
a driven ram reciprocatingly moveable within the housing between a retracted position and an extended position,
the ram having an engagement face oriented toward the outlet end of the housing,
the engagement face urging silage toward the outlet end of the housing during movement of the ram toward its extended position,
the engagement face substantially aligned with the outlet end of the housing when the ram is in the extended position,
a hollow elongate frame mounted to the housing at its outlet end,
the frame having a generally horizontally disposed outer surface,
the frame receiving an open end of an elongate silage bag thereabout and storing unused portions of the bag on the outer surface thereof.

* * * * *